United States Patent
Gupta et al.

(10) Patent No.: US 11,003,752 B2
(45) Date of Patent: May 11, 2021

(54) CONTEXTUAL DEVICE UNLOCKING (71) Applicant: HEWLETT-PACKARD DEVELOPMENT COMPANY, L.P., Houston, TX (US)

(72) Inventors: Mohit Gupta, San Diego, CA (US); Christopher C Kruger, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 33 days.

(21) Appl. No.: 16/092,107

(22) PCT Filed: Jul. 14, 2016

(86) PCT No.: PCT/US2016/042251
§ 371 (c)(1),
(2) Date: Oct. 8, 2018

(87) PCT Pub. No.: WO2018/013117
PCT Pub. Date: Jan. 18, 2018

(65) Prior Publication Data
US 2019/0121950 A1  Apr. 25, 2019

(51) Int. Cl.
*G06F 21/00* (2013.01)
*G06F 21/32* (2013.01)
*G06F 21/35* (2013.01)
*G06F 21/45* (2013.01)
*H04L 29/06* (2006.01)
*H04W 12/30* (2021.01)
(Continued)

(52) U.S. Cl.
CPC ............ *G06F 21/32* (2013.01); *G06F 21/35* (2013.01); *G06F 21/45* (2013.01); *H04L 63/0853* (2013.01); *H04L 63/107* (2013.01); *H04W 12/30* (2021.01); *H04W 12/61* (2021.01); *H04W 12/63* (2021.01)

(58) Field of Classification Search
CPC ....................................... G06F 21/32
See application file for complete search history.

(56) References Cited

U.S. PATENT DOCUMENTS

| 8,396,452 B1 | 3/2013 | Matsuoka |
| 8,914,875 B2 | 12/2014 | Matus |
| 8,994,499 B2 | 3/2015 | Zhao et al. |

(Continued)

FOREIGN PATENT DOCUMENTS

CN   104756122 A   7/2015

OTHER PUBLICATIONS

"A Wireless Sensor that Locks Your Mac when you walk away", Jun. 2, 2015.

(Continued)

*Primary Examiner* — Josnel Jeudy
(74) *Attorney, Agent, or Firm* — HP Patent Department (57) ABSTRACT

Examples associated with contextual device unlocking are described. One example storing sets of contextual state information associated with unlock events associated with a device. A first contextual state of the device is detected. The first contextual state of the device is compared to sets of contextual state information. The device is unlocked based on the comparison of the first contextual state of device to the sets of contextual state information when the device is in a secure location with a nearby authorized user.

14 Claims, 7 Drawing Sheets

(51) Int. Cl.
*H04W 12/61* (2021.01)
*H04W 12/63* (2021.01)

(56) References Cited

U.S. PATENT DOCUMENTS

| | | | |
|---|---|---|---|
| 2009/0158423 A1 | 6/2009 | Orlassino et al. | |
| 2010/0225443 A1 | 9/2010 | Bayram et al. | |
| 2011/0080359 A1* | 4/2011 | Jang | G06F 3/04883 |
| | | | 345/173 |
| 2011/0117970 A1 | 5/2011 | Choi | |
| 2011/0256906 A1* | 10/2011 | Kumar | H04W 12/06 |
| | | | 455/558 |
| 2013/0091564 A1* | 4/2013 | Fitzgerald | H04L 63/12 |
| | | | 726/17 |
| 2013/0227450 A1* | 8/2013 | Na | G06F 3/048 |
| | | | 715/764 |
| 2013/0247117 A1* | 9/2013 | Yamada | G08C 17/02 |
| | | | 725/93 |
| 2014/0123273 A1 | 5/2014 | Matus | |
| 2014/0123307 A1* | 5/2014 | Jung | H04L 41/00 |
| | | | 726/27 |
| 2014/0354567 A1* | 12/2014 | Park | G06F 1/1684 |
| | | | 345/173 |
| 2016/0035163 A1* | 2/2016 | Conrad | H04W 12/0433 |
| | | | 340/5.61 |
| 2016/0036788 A1* | 2/2016 | Conrad | H04W 12/06 |
| | | | 713/168 |
| 2018/0032748 A1* | 2/2018 | Rueger | H04L 63/04 |

OTHER PUBLICATIONS

"Gatekeeper—Wireless Access Control, Computer Security, Automatically Lock and Unlock", 2016.
"How to Lock Your Computer with Bluetooth Proximity Lock Utility", Apr. 27, 2010.
"Proxlok Locks Your Computer Screen When you Walk Away From It", Jun. 18, 2015.

* cited by examiner

CONTEXTUAL DEVICE UNLOCKING

BACKGROUND

Companies and consumers may store valuable data on personal computers and/or laptops that are operated by employees or the consumers themselves. To access the data, users may perform a variety of tasks to prove they are authorized to access the data. These tasks may include, for example, entering a personal identification number or password, proving identity via a biometric, presenting an authenticating device, and so forth.

BRIEF DESCRIPTION OF THE DRAWINGS

The present application may be more fully appreciated in connection with the following detailed description taken in conjunction with the accompanying drawings.

DETAILED DESCRIPTION

Systems, methods, and equivalents associated with contextual device unlocking are described. A device such as a personal computer may monitor contextual information about usage of the device. This contextual information may be related to, for example, where the device is when the device is being used. Consequently, the device may learn over time factors that indicate the device is in a secure location. Additionally, the device may be configured to detect a presence of an authorized user based on for example, a secure device associated with the authorized user.

When the device determines that it is in the secure location with the nearby authorized user, the device may, automatically unlock itself without an input from the authorized user. If the device determines the authorized user moves away from the device, the device may automatically lock itself to prevent important data from being accessed while the authorized user is not close enough to prevent inappropriate access to the device itself. When the device is not in a known secure location, the device may request the authorized user manually unlock the device for use to ensure the mere presence of the user does not automatically unlock the device. Learning scenarios where the device can safely unlock automatically, as well as when the device should insist on more stringent security measures may increase the usability of the device, as well as reduce the risk that the device be inappropriately accessed.

Figure 1:
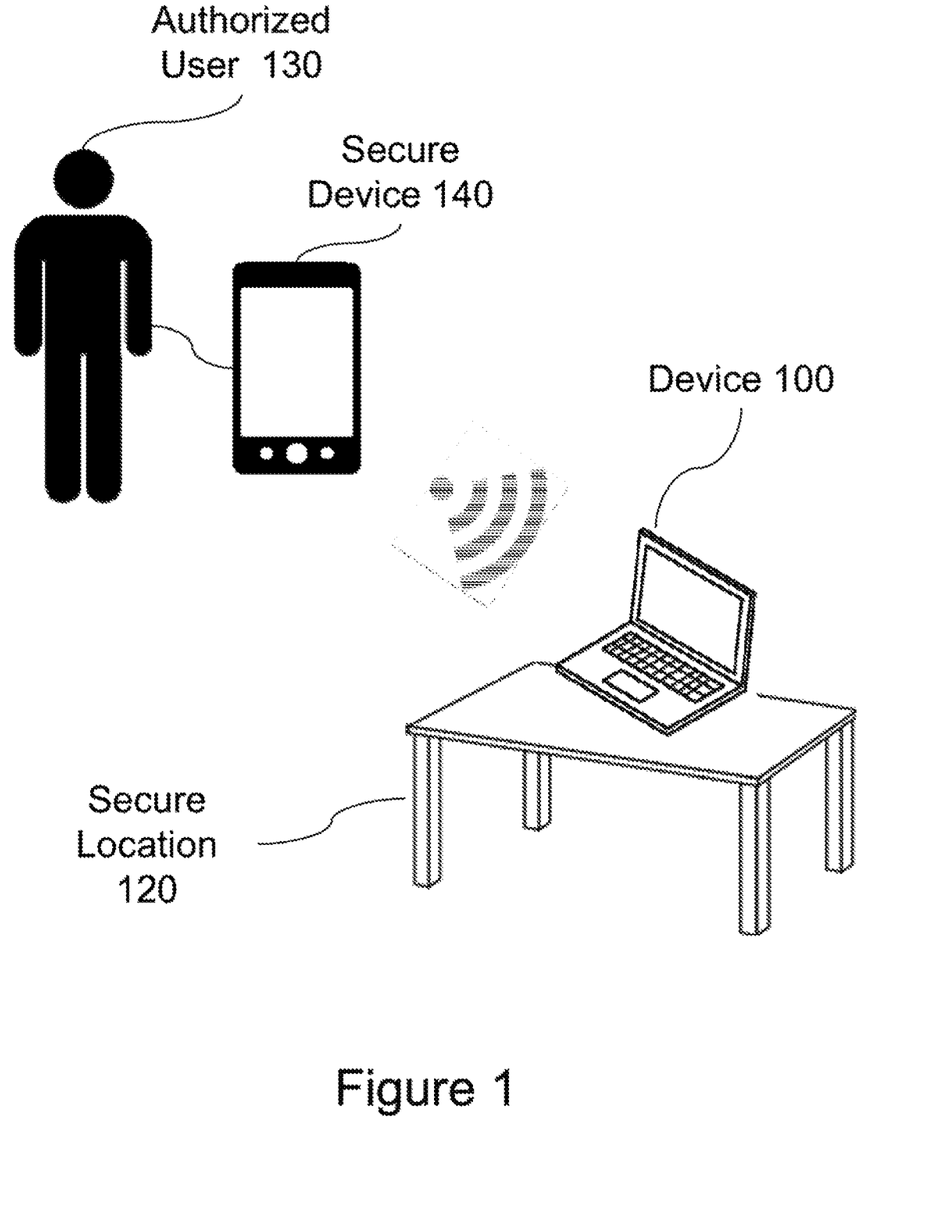
FIG. 1 illustrates an example device associated with contextual device unlocking.

FIG. 1 illustrates an example device associated with contextual device unlocking. It should be appreciated that the items depicted in FIG. 1 are illustrative examples, and many different systems, devices, and so forth, may operate in accordance with various examples.

FIG. 1 illustrates a device 100. In this example, device 100 is illustrated as a laptop, though other types of devices (e.g., tablets, cellular phones, desktop computers) may also function as described herein. In this example, device 100 is illustrated as being in a secure location 120. Initially, device 100 may be unsure that its current location is a secure location. Over time, device 100 may monitor when device 100 is locked and unlocked within the location and learn whether the location is secure, when the location is secure, and other attributes that define secure location 120. As used herein, a secure location is considered a location where device 100 is regularly operated under normal circumstances. By way of illustration, a device 100 may learn to consider a home office and a work office of a user (e.g., authorized user 130) as secure locations, but not a coffee shop the user occasionally visits.

To learn whether a location is a secure location, device 100 may track contextual state information associated with login and logouts by users (e.g., authorized user 130). Contextual state information may be information that is external to device 100 that describes a state of the surroundings of device 100 during specific events. In examples described herein, the specific events may include, for example, events associated with granting or restring access to device 100 such as login events, unlock events, logout events, lock events, and so forth. Events may include, for example, manual events where a user accesses device 100 by deliberately providing a credential (e.g., a password, a biometric), as well as automatic events that trigger as a result of an automatic process of device 100 (e.g., a usage timeout of device 100 that causes device 100 to lock itself due to inactivity).

A variety of contextual state information may be monitored by device 100. The contextual state information may be used to evaluate wither device 100 is in secure location 120 and whether automatic unlocking of device 100 is appropriate. contextual state information may include, for example, temporal information, location information, presences of nearby devices, proximity of device 100 to a secure device 140 associated with authorized user 130, accelerometer data associated with secure device 140, peripheral devices connected to device 100 and so forth.

Temporal information may include, for example, times at which a device 100 is unlocked. By way of illustration, device 100 may record times during which device 100 is regularly unlocked and in use, as well as when device 100 is locked and not being used. When combined with other information that indicates device 100 is in secure location 120, device 100 may decide, based on whether device 100 is regularly in use at or around that time, to automatically unlock. This may be desirable to ensure that device 100, despite being in secure location 120, does not automatically unlock in the middle of the night when device 100 is not normally used at that time.

Location information may include geographic or other information that identifies a specific location of device 100. The geographic information may be derived from global positioning data, and so forth. In some examples, location information may also be determined based on nearby WIFI networks using distances to nearby wireless routers. As device 100 is regularly unlocked in a specific location, device 100 may come to recognize that on as a secure location based on these nearby networks.

Presences of nearby devices may be determined based on a variety of wireless communication techniques including, for example, wireless, Bluetooth, near field communication, and so forth. Nearby devices may include, for example, wireless routers, other devices broadcasting using those networks, and so forth. These other devices may include mobile devices, computers, printers, and so forth. Consequently, regularly detecting the same devices during unlock events, may increase device 100 in its confidence of being at a secure location.

Peripherals connected to device 100 may also indicate when device 100 is in a secure location. These peripherals may include, for example, keyboards, mice, displays, docking stations, printers, and so forth. By way of illustration, if a user regularly places device 100 in a docking station and/or connects several peripherals to device 100 before unlocking device 100, device 100 may learn that these peripherals indicate that device 100 is in a secure location and automatically unlock when connected to these devices.

To determine whether authorized user 130 is nearby, authorized user 130 may be associated with secure device 140 that can communicate with device 100. Secure device 140, may be for example, a mobile device (e.g., cell phone) used by authorized user 130. When secure device 140 is nearby device 100, device 100 may believe that authorized user 130 is able to be responsible for the security of device 100, and therefore automatically unlock.

Further, device 100 may take into account, accelerometer data associated with secure device 140 in addition to distance between device 100 and secure device 140. Accelerometer data may allow device 100 to determine when secure device 140, and therefore authorized user 130, is moving towards or away from device 100. Consequently, device 100 may be able to more accurately unlock and/or lock based on whether authorized user 130 is moving towards or away from device 100.

As device 100 learns conditions during which device 100 is locked and unlocked through the collection of contextual state information over time, device 100 may periodically compare its current contextual state to the stored collection of contextual state information. When device 100 is confident that the current contextual state of device 100 indicates that device 100 is in a secure location, device 100 may prepare to automatically unlock when authorized user 130 is nearby device 100 as detected by the presence of secure device 140. Because contextual state information associated with a known secure location may not be constant (e.g., different peripherals may be attached, different nearby devices may be detected), device 100 may use a heuristic approach to determine when device 100 is in a secure location. By way of illustration, device 100 may assign weights to various factors indicating that device 100 is in secure location 120, and when the sum of weighted factors surpasses a known threshold, device 100 may be prepared to automatically unlock. When the factors fall below the threshold, device 100 may either automatically lock, or request a password from authorized user 130 despite detecting the presence of authorized user 130 via secure device 140.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module" as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
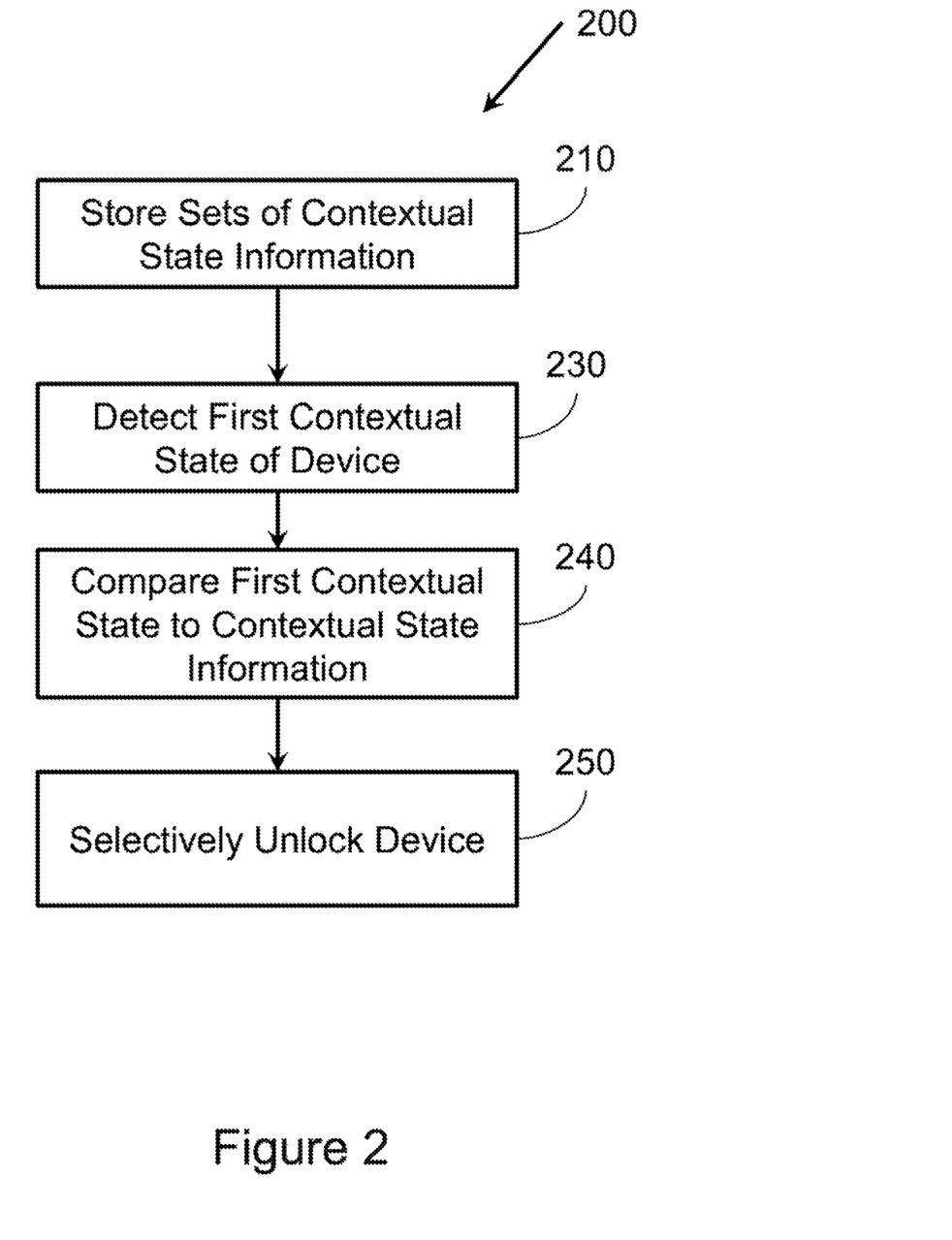
FIG. 2 illustrates a flowchart of example operations associated with contextual device unlocking.

FIG. 2 illustrates an example method 200 associated with contextual device unlocking. Method 200 may be embodied on a non-transitory processor-readable medium storing processor-executable instructions. The instructions, when executed by a processor, may cause the processor to perform method 200. In other examples, method 200 may exist within logic gates and/or RAM of an application specific integrated circuit (ASIC).

Method 200 includes storing sets of contextual state information at 210. A set of contextual stat information may be associated with an unlock event associated with a device. Contextual state information may be information external to the device that describes a state of the surroundings of the device. Recording contextual state information during occurrences of events may facilitate comparing a current contextual state of the device to the recorded contextual state information and taking an action based on this comparison. As described above, contextual state information may include, for example, temporal information, location information, presences of nearby devices, proximity of the device to a secure device associated with an authorized user, accelerometer data associated with the secure device, peripheral devices connected to the device, and so forth. Presences of nearby devices may be detected based on, for example, wireless signals (e.g., WIFI, Bluetooth, near field communication) transmitted by the nearby devices. In some examples, the contextual state information may include signal strength of the wireless signals transmitted by the nearby devices. Signal strength may facilitate, for example, pinpointing a location of the device, determining how close a nearby device is, and so forth.

In one example, the device may be a computing device (e.g., personal computer) and the secure device associated with the authorized user may be a mobile device associated with the authorized user (e.g., phone, tablet). In this example, the mobile device associated with the authorized user may verify that the mobile device is in possession of the authorized user via a biometric match between the authorized user and a profile associated with the authorized user stored on the mobile device. By way of illustration, the mobile device may store iris information associated with the authorized user. If the mobile device detects that the person most recently in possession of the mobile device does not have an iris that matches the iris information in the profile associated with the authorized user, the mobile device may transmit this information to the device to prevent the device from automatically unlocking.

Method 200 also includes detecting a first contextual state of the device at 230. Method 200 also includes comparing the first contextual state to sets of contextual state information at 240. Consequently, the first contextual state of the device may be a current state of the device, and the sets of contextual state information may represent prior states of the device. Comparing the first contextual state of the device to the sets of contextual state information may facilitate determining whether the current contextual state of the device shares similar contextual information with times when the device was unlocked.

Method 200 also includes selectively unlocking the device at 250. The device may be unlocked based on the comparison of the first contextual state to the sets of contextual state information. The device may be unlocked when the device determines it is in a secure location with a nearby authorized user. This may be achieved based on, for example, heuristics regarding the contextual state information.

To illustrate, past contextual state information may record states of the device when it was manually unlocked. Consider a scenario where the past contextual state information indicates that the device is unlocked at a first specific geographic location with a relatively high frequency, at a second geographic location with a relatively moderate frequency, at a specific time with a relatively moderate frequency, while connected to a dock with a relatively high frequency, and nearby a known wireless network with a relatively low frequency. If the current state of the device indicates that the device is in the first geographic location and connected to the dock, confidence that the device may be relatively high it is in a secure location and allow automatic unlocking when the user is nearby. This may be true even if the device is not being unlocked at the specific time. If the current state of the device indicates that the device is at the second geographic location nearby the known wireless network, the device may not yet be confident it is in a secure location, and therefore require manually unlocking by the authorized user. However, this manual unlock may then be recorded, increasing the likelihood that the device allows unlocking in a similar scenario.

Figure 3:
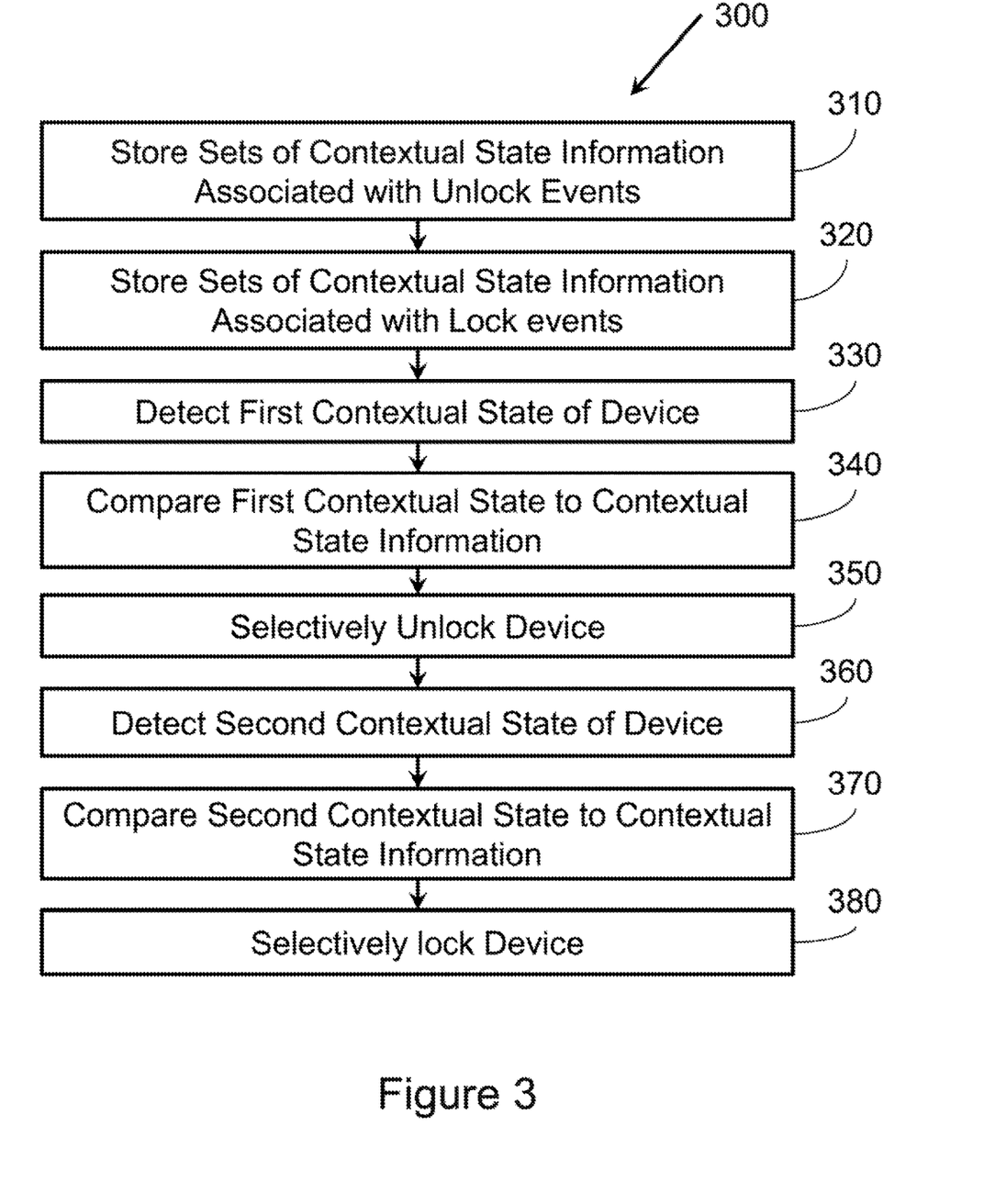
FIG. 3 illustrates another flowchart of example operations associated with contextual device unlocking.

FIG. 3 illustrates a method 300 associated with contextual device unlocking. Method 300 includes several actions similar to those described above with reference to method 200 (FIG. 2). For example, method 300 includes storing sets of contextual state information associated with unlock events at 310, detecting a first contextual state of a device at 330, comparing the first contextual state to contextual state information at 340, and selectively unlocking the device at 350.

Method 300 also includes storing sets of contextual state information associated with lock events associated with the device at 320. Method 300 also includes detecting a second contextual state of the device at 360. Thus, the second contextual state may be another current state of the device, and the sets of contextual state information may include state information regarding when the device is unlocked. This state information may be generated either as a result of a manual locking of the device, or an automatic timeout (e.g., due to entering a power save mode).

Method 300 also includes comparing the second contextual state of the device to sets of contextual state information at 370. Method 300 also includes selectively locking the device at 380 based on the comparison of the second contextual state of the device to the sets of contextual state information. The device may be locked when the device is no longer in a secure location with a nearby authorized user. In some examples, this locking may occur when the authorized user moves away from the device. In other examples, it may occur because the authorized user is moving around with the device and the device would like to confirm it is in possession of the authorized user.

Figure 4:
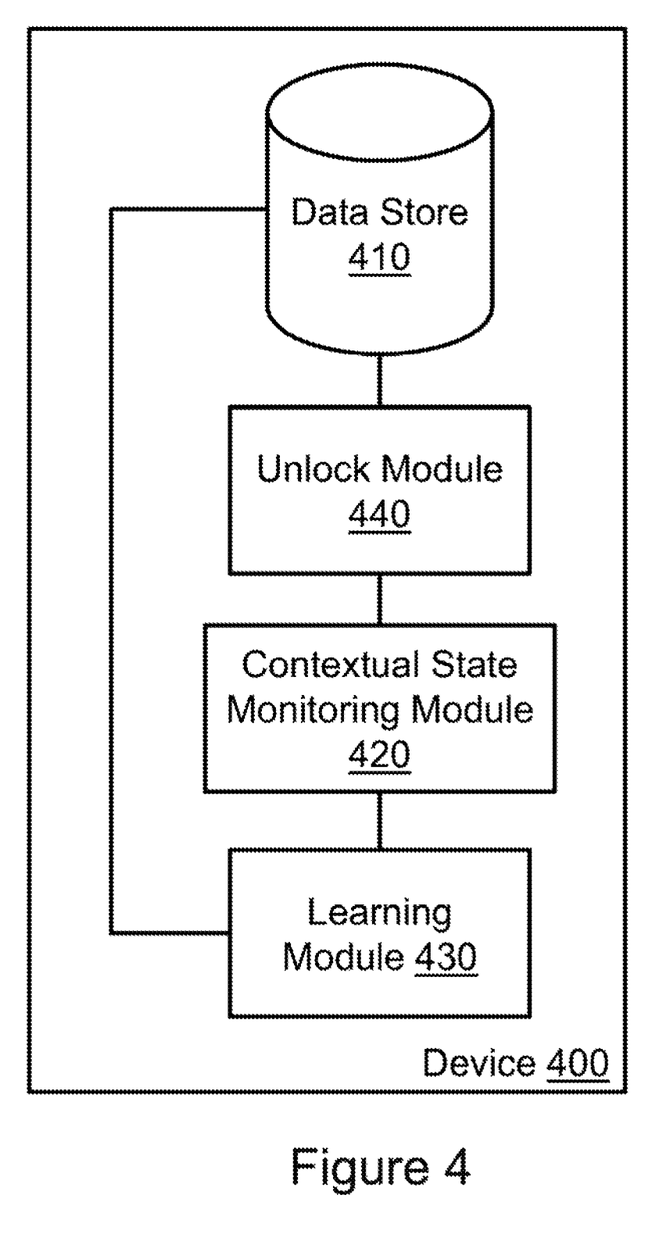
FIG. 4 illustrates another example device associated with contextual device unlocking.

FIG. 4 illustrates an example device associated with contextual device unlocking. Device 400 includes a data store 410. Data store 410 may store contextual state information associated with device 400. Contextual states of the device may describe external conditions of the device. Contextual state information may include information describing, for example, temporal information, location information, presences of nearby devices, proximity of the device to a secure device associated with an authorized user, accelerometer data associated with the secure device, peripheral devices connected to the device, and so forth.

Device 400 also includes a contextual state monitoring module 420. Contextual state monitoring module 420 may monitor a contextual state of device 400 while device 400 is operating. Contextual state monitoring module may periodically provide the contextual state of device 400 to other components of device 400.

For example, device 400 also includes a learning module 430. Learning module 430 may store contextual state information in data store 410 during unlock events of device 400. Thus, learning module 430 may facilitate tracking states of device 400 when it is being unlocked so that later states of device 400 can be compared to past states of device 400 during unlock events.

Device 400 also includes an unlock module 440. Unlock module 440 may periodically compare the contextual state of device 400 received from contextual state monitoring module 420 to contextual state information in data store 410. In various examples, unlock module 440 may compare contextual state information from, data store 410 to the contextual state of device 400 using a support vector machine, clustering, a neural network, a decision tree, and so forth.

Unlock module 440 may unlock device 400 when unlock module 440 determines the contextual state of device 400 indicates security of device 400 achieves a certain threshold. By way of illustration, the security of device 400 may achieve the certain threshold when two conditions are met. First the certain threshold may include unlock module 440 believing, based on location information and presences of nearby devices, that device 400 is in a secure location. Second, the certain threshold may include unlock module 440 believing, based on proximity of device 400 to the secure device, that the authorized user is sufficiently close to device 400 to operate device 400. In further examples, unlock module 440 may rely on accelerometer data associated with the secure device to determine whether the authorized user is moving towards device 400 or away from device 400.

Figure 5:
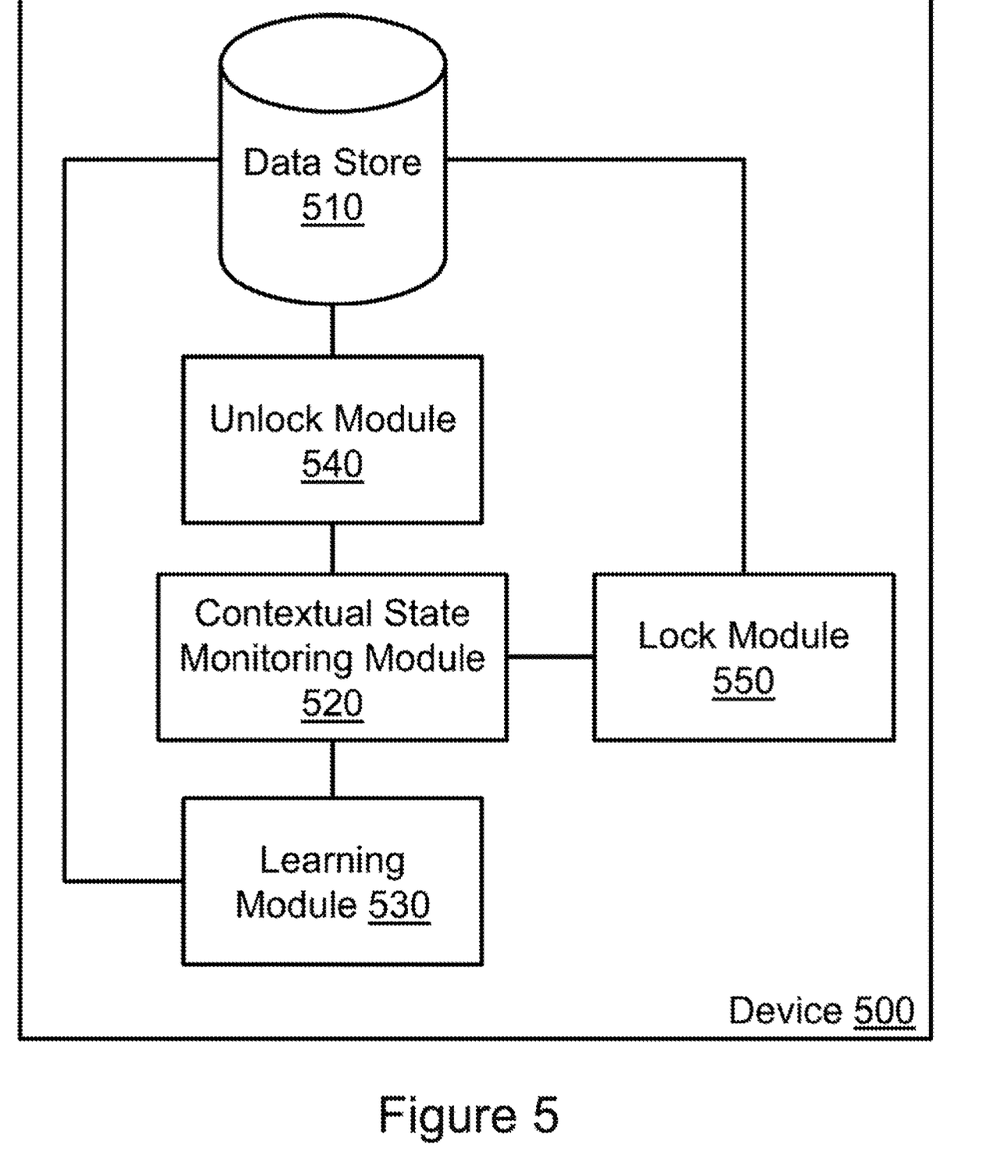
FIG. 5 illustrates another example device associated with contextual device unlocking.

FIG. 5 illustrates a device 500 associated with contextual device unlocking. Device 500 includes several items similar to those described above with reference to device 400 (FIG. 4). For example, device 500 includes a data store 510 to store contextual state information of device 500, a contextual state monitoring module 520, a learning module 530, and an unlock module 540.

Device 500 also includes a lock module 550. Lock module 550 may periodically compare a contextual state of device 500 received from contextual state monitoring module 520 to contextual state information in data store 510. Lock module 550 may also lock device 500 if lock module 550 determines the contextual state of device 500 indicates security of the device falls below the certain threshold. Security of device 500 may fall below the certain threshold when an authorized user has moved away from device 500. This may be detected based on the proximity of device 500 to the secure device associated with the authorized user, as well as accelerometer data associated with the secure device, in this example, learning module 530 may also store contextual state information in data store 510 associated with lock events of the device.

Figure 6:
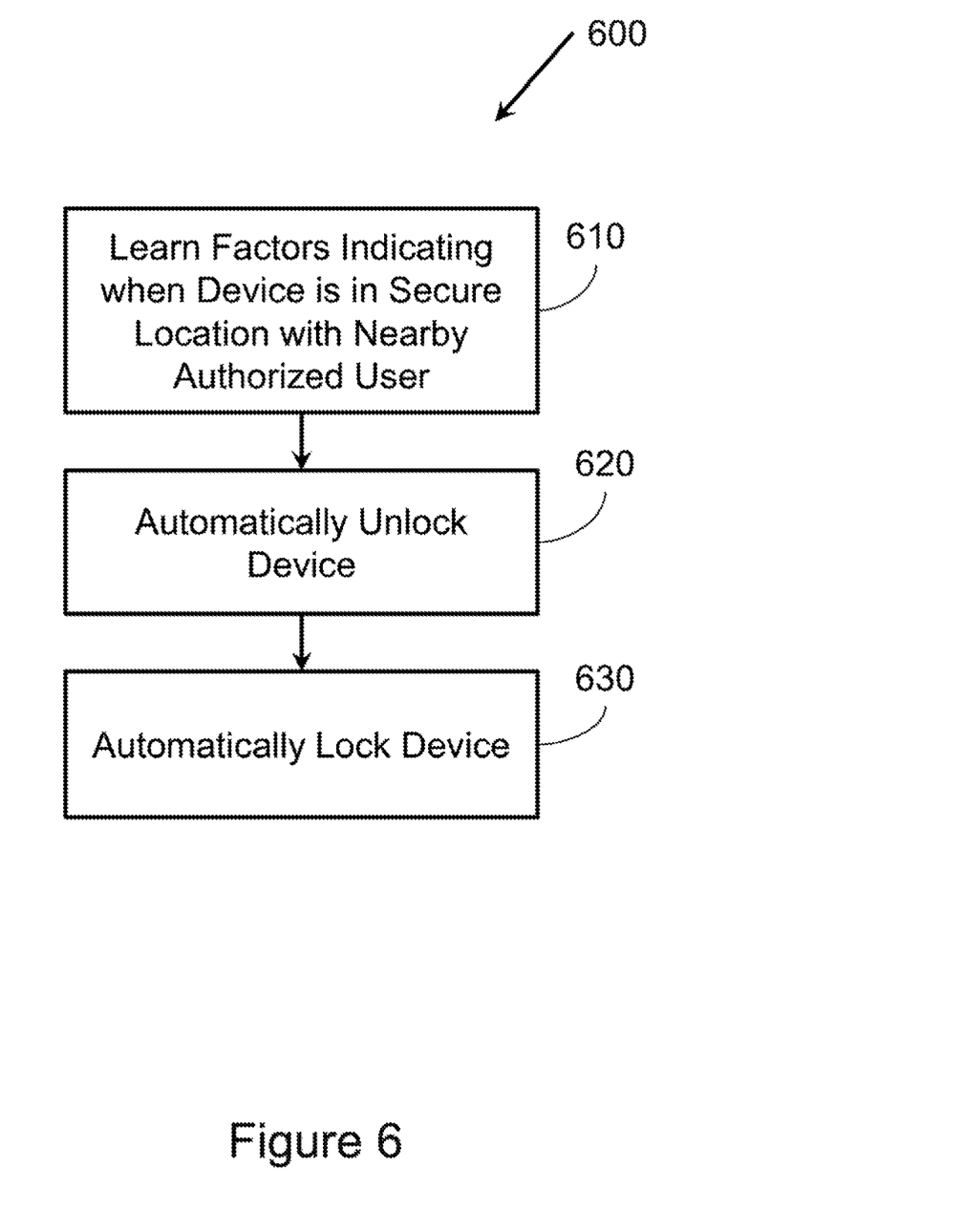
FIG. 6 illustrates another flowchart of example operations associated with contextual device unlocking.

FIG. 6 illustrates a method 600 associated with contextual device unlocking. Method 600 includes learning factors indicating when a device in a secure location with a nearby authorized user at 610. These factors may be learned based on contextual state information obtained during unlock events associated with the device.

Method 600 also includes automatically unlocking the device when the device is in a secure location with a nearby authorized user at 620. Proximity of a secure device associated with the authorized user may be used to evaluate whether the device is nearby the authorized user. Method 600 also includes automatically locking the device the device is no longer in the secure location with the nearby authorized user at 630.

Figure 7:
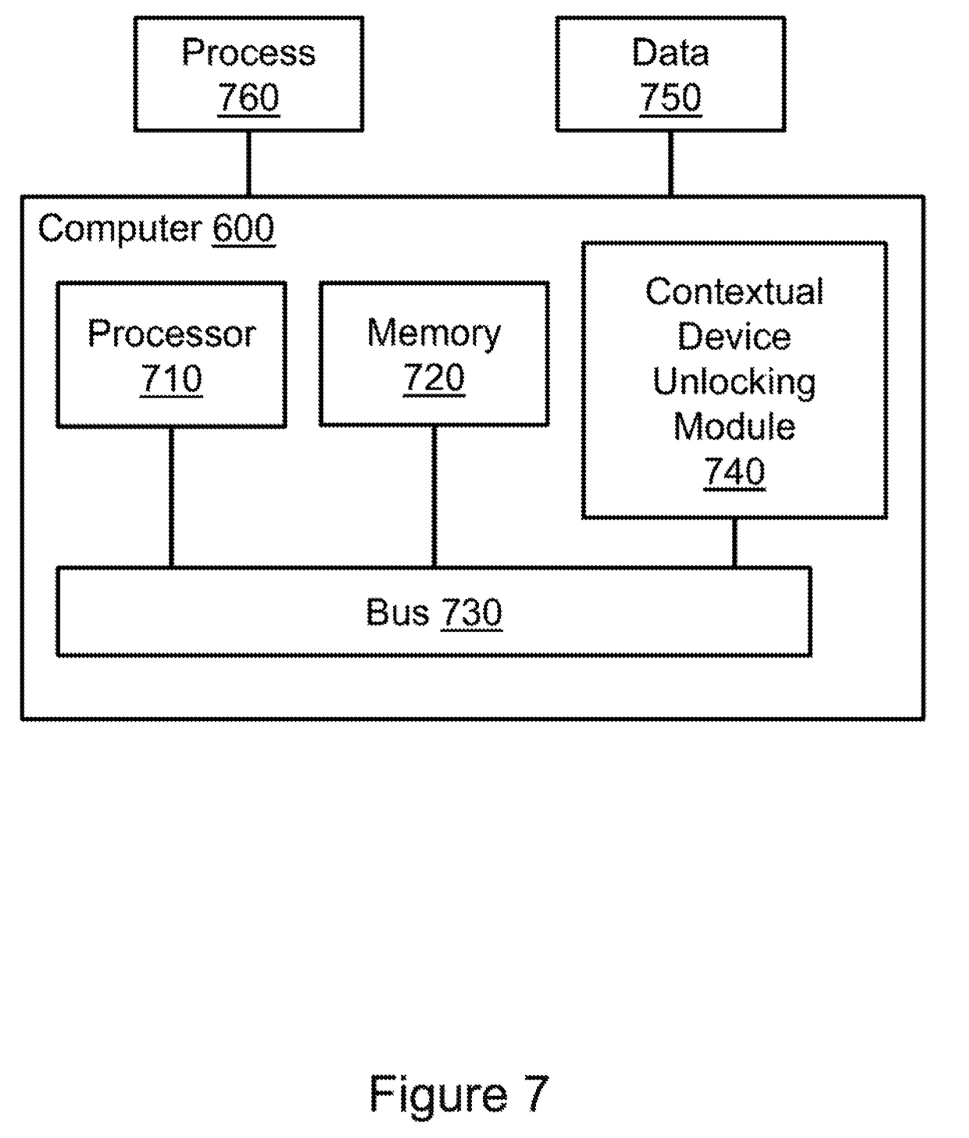
FIG. 7 illustrates an example computing device in which example, systems, and methods, and equivalents, may operate.

FIG. 7 illustrates an example computing device in which example systems and methods, and equivalents, may operate. The example computing device may be a computer 700 that includes a processor 710 and a memory 720 connected by a bus 730. Computer 700 includes a contextual device unlocking module 740. Contextual device unlocking module 740 may perform, alone or in combination, various functions described above with reference to the example systems, methods, and so forth. In different examples, contextual device unlocking module 740 may be implemented as a non-transitory computer-readable medium storing processor-executable instructions, in hardware, software, firmware, an application specific integrated circuit, and/or combinations thereof.

The instructions may also be presented to computer 700 as data 750 and/or process 760 that are temporarily stored in memory 720 and then executed by processor 710. The processor 710 may be a variety of processors including dual microprocessor and other multi-processor architectures. Memory 720 may include non-volatile memory (e.g., read only memory) and/or volatile memory (e.g., random access memory). Memory 720 may also be, for example, a magnetic disk drive, a solid state disk drive, a floppy disk drive, a tape drive, a flash memory card, an optical disk, and so on. Thus, memory 720 may store process 760 and/or data 750. Computer 700 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method, comprising:
    storing, on a computing device, a plurality of contextual state information associated with unlock events and lock events associated with the computing device, wherein the contextual state information includes information describing temporal information, location information, and presences of nearby devices;
    assigning a weight to each contextual state information of the plurality of contextual state information;
    detecting a contextual state of the computing device, wherein the contextual state includes a plurality of contextual states;
    applying the weight to each contextual state of the plurality of contextual states based on a comparison of each contextual state of the computing device to the plurality of contextual state information; and
    selectively unlocking the computing device when a sum of the applied weight of each contextual state reaches a threshold, wherein reaching the threshold indicates when the computing device is in a secure location with a nearby authorized user.

2. The method of claim 1, comprising:
    detecting a change in the contextual state of the computing device;
    applying the weight of each contextual state information to each changed contextual state based on a comparison of each changed contextual state of the computing device to the plurality of contextual state information; and
    selectively locking the computing device when the sum of the applied weight of each contextual state falls below the threshold, wherein falling below the threshold determines when the computing device is no longer in a secure location with a nearby authorized user.

3. The method of claim 1, where the plurality of contextual state information includes one or more of, temporal information, location information, presences of nearby devices, proximity of the computing device to a secure device associated with the authorized user, accelerometer data associated with the secure device, and peripheral devices connected to the computing device.

4. The method of claim 3, where the presences of nearby devices are detected based on wireless signals transmitted by the nearby devices.

5. The method of claim 4, where the plurality of contextual state information includes signal strength of wireless signals transmitted by the nearby devices.

6. The method of claim 3, where the secure device associated with the authorized user is a mobile device associated with the authorized user.

7. The method of claim 6, where the mobile device associated with the authorized user verifies that the mobile device is in possession of the authorized user via biometric match between the authorized user and a profile associated with the authorized user stored on the mobile device.

8. A computing device, comprising:
    a non-transitory computer-readable medium storing processor-executable instructions that when executed by a processor cause the processor to:
        store contextual state information associated with the computing device on the computing device, wherein the contextual state information describe external conditions of the computing device and includes information describing temporal information, proximity of the computing device to a secure device associated with an authorized user, and accelerometer data associated with the secure device;
        monitor a plurality of contextual states of the computing device while the computing device is operating;
        store contextual state information in a data store during unlock events of the computing device;
        apply a weight to each contextual state of the plurality of contextual states;
        periodically compare each contextual state of the plurality of contextual states of the computing device to contextual state information in the data store; and unlock the computing device responsive to determining a sum of the weight applied to each contextual state of the plurality of the contextual states of the computing device reaches a threshold.

9. The computing device of claim 8, further comprising instructions to:
   apply a weight to each contextual state of the plurality of contextual states;
   periodically compare each contextual state of the plurality of contextual states of the computing device to contextual state information in the data store;
   lock the computing device responsive to determining a sum of the weight applied to each contextual state of the plurality of the contextual states of the computing device falls below the threshold; and
   store contextual state information in the data store during lock events of the computing device.

10. The device of claim 8, where the sum of the weight applied to each contextual state of the plurality of the contextual states of the device reaches the threshold when it is determined that the computing device is in a secure location, based on location information, and presences of nearby devices, and when it is determined that the authorized user is sufficiently close to the computing device to operate the device, based on proximity of the computing device to the secure device and accelerometer data associated with the secure device.

11. The computing device of claim 9, where the sum of the weight applied to each contextual state of the plurality of the contextual states of the computing device falls below the threshold when that an authorized user has moved away from the computing device, based on proximity of the computing device to the secure device and accelerometer data associated with the secure device.

12. The computing device of claim 8, further comprising instructions to compare the contextual state of the computing device to contextual state information in the data store using one of, a support vector machine, clustering, a neural network, and a decision tree.

13. A non-transitory computer-readable medium storing processor-executable instructions that when executed by a processor cause the processor to:
   learn factors that indicate a computing device is in a secure location with a nearby authorized user based on contextual state information obtained during unlock events associated with the computing device;
   store the contextual state information on the computing device, wherein the contextual state information includes information describing temporal information, location information, and peripheral devices connected to the computing device;
   assign a weight to the contextual state information;
   apply the weight assigned to the contextual state information to a contextual state;
   automatically unlock the computing device when the applied weight applied to the contextual state reaches a threshold and determines that the computing device is in a secure location with a nearby authorized user; and
   automatically lock the computing device when the applied weight applied to the contextual state falls below the threshold and determines that the computing device is no longer in a secure location with a nearby authorized user.

14. The non-transitory computer-readable medium of claim 13, where proximity of a secure device associated with the authorized user is used to evaluate whether the computing device is nearby the authorized user.

* * * * *